United States Patent [19]

Moore

[11] Patent Number: 4,727,687

[45] Date of Patent: Mar. 1, 1988

[54] EXTRUSION ARRANGEMENT FOR A CRYOGENIC CLEANING APPARATUS

[75] Inventor: David E. Moore, Cincinnati, Ohio

[73] Assignee: Cryoblast, Inc., West Haven, Conn.

[21] Appl. No.: 681,903

[22] Filed: Dec. 14, 1984

[51] Int. Cl.⁴ .............................................. B29C 47/30
[52] U.S. Cl. .................................... 51/410; 51/322;
 62/35; 62/354; 425/198; 425/199; 425/289;
 425/376 R
[58] Field of Search ............ 425/197, 198, 199, 376 R,
 425/311, 289; 62/35, 354; 51/317, 319, 320,
 322, 410

[56] References Cited

U.S. PATENT DOCUMENTS

| | | | |
|---|---|---|---|
| 2,743,554 | 5/1956 | Dailey et al. | 51/321 |
| 3,357,051 | 12/1967 | Zolotarevsky | 425/198 |
| 3,576,112 | 4/1971 | Frost et al. | 62/354 |
| 3,660,986 | 5/1972 | Hardt et al. | 62/35 |
| 3,670,516 | 6/1972 | Duron et al. | 62/35 |
| 3,702,519 | 11/1972 | Rice et al. | 51/320 |
| 3,708,993 | 1/1973 | Hardt et al. | 62/35 |
| 3,737,506 | 6/1973 | Martin et al. | 425/198 |
| 3,856,277 | 12/1974 | Tiramani | 425/197 |
| 4,038,786 | 8/1977 | Fong | 51/320 |
| 4,316,711 | 2/1982 | Wellborn | 425/198 |
| 4,355,488 | 10/1982 | Schmitz et al. | 51/319 |
| 4,479,768 | 10/1984 | Kube et al. | 425/198 |

FOREIGN PATENT DOCUMENTS

| | | | |
|---|---|---|---|
| 43030 | 1/1966 | German Democratic Rep. | 425/198 |
| 849726 | 9/1960 | United Kingdom | 425/198 |

*Primary Examiner*—Willard E. Hoag
*Attorney, Agent, or Firm*—Frank J. Thompson

[57] ABSTRACT

Cryogenic cleaning apparatus using dry ice pellets having a pellet extruder and static means to break the extruded dry ice.

3 Claims, 3 Drawing Figures

EXTRUSION ARRANGEMENT FOR A CRYOGENIC CLEANING APPARATUS

FIELD OF THE INVENTION

This invention relates to the design of dies for the extrusion of small, high-density, solid, carbon dioxide or "dry ice" pallets of desired size and length.

The production of solid, carbon dioxide or "dry ice" by injection of liquid carbon dioxide under pressure into a cylinder, collecting the small crystals thus formed and then compressing the crystals to form solid carbon dioxide is a process well known to those familiar with the art. A further step of extruding the solid material thru a die to form pellets is also well known. In equipment presently available, such pellets are generally of the size of ordinary small ice cubes, and the pellets are of only medium density in relation to the highest possible density for solid carbon dioxide. The normal use of such pellets formed from ice cubes is to provide temporary refrigeration of foodstuffs or similar products during transportation.

The present invention pertains to an economical design of a die for producing small, high-density, sharp-edged pellets of solid, carbon dioxide for use in a blast cleaning process. In this process, pellets are impacted at high velocity against a surface from which it is desired to remove unwanted material or contamination. The extrusion of the solid carbon dioxide or "dry ice" pellets requires very high pressure. However, because of the multiplicity of holes required in the die, it is difficult to make the die plate sufficiently strong without excessive fabrication costs.

SUMMARY OF THE INVENTION

This invention provides a more economical means of fabricating the die parts, provides a convenient method of changing the die to produce different size pellets, and because of the novel configuration of the holes in the dies, provides an effective means of producing the small, high density pellets required for the blast cleaning process.

Accordingly an object of this invention are
to provide an economical means of fabricating the dies for extruding dry ice pellets.
To provide high strength supporting structure for the extrusion dies by economical fabricationmethods.
Another object is to provide a means of readily changing the die size without necessity of handling excessively heavy parts or the use of large cumbersome tools.
Another object is to provide an improved means for forming carbon dioxide pellets of suitable size and density from a solid cake of carbon dioxide or "dry ice".
Another object is to accomplish the extrusion process with no moving parts, thus eliminating the need for lubrication of active mechanisms in the cryogenic temperature range.
Another object is to control the production of the pellets such that they are of the desired length and incorporate broken and irregular ends to further enhance the abrasive properties of the pellets.
Another object is to extrude the solid dry ice through a pattern of holes contoured such that they compress the solid dry ice smoothly to prevent erratic fracturing and breaking of the pellets while in storage in a hopper or in transit to the blasting nozzle. To passively break the pellets by incorporating a breaker plate comprised of holes that register with the holes at the exit of the extrusion die but are set at an angle, thus breaking the pellets to the desired length.

BRIEF DESCRIPTION OF THE DRAWINGS

These and other objects and features of the invention will become apparent with reference to the following specification and to the drawings, wherein.

DETAILED DESCRIPTION

Figure 1:
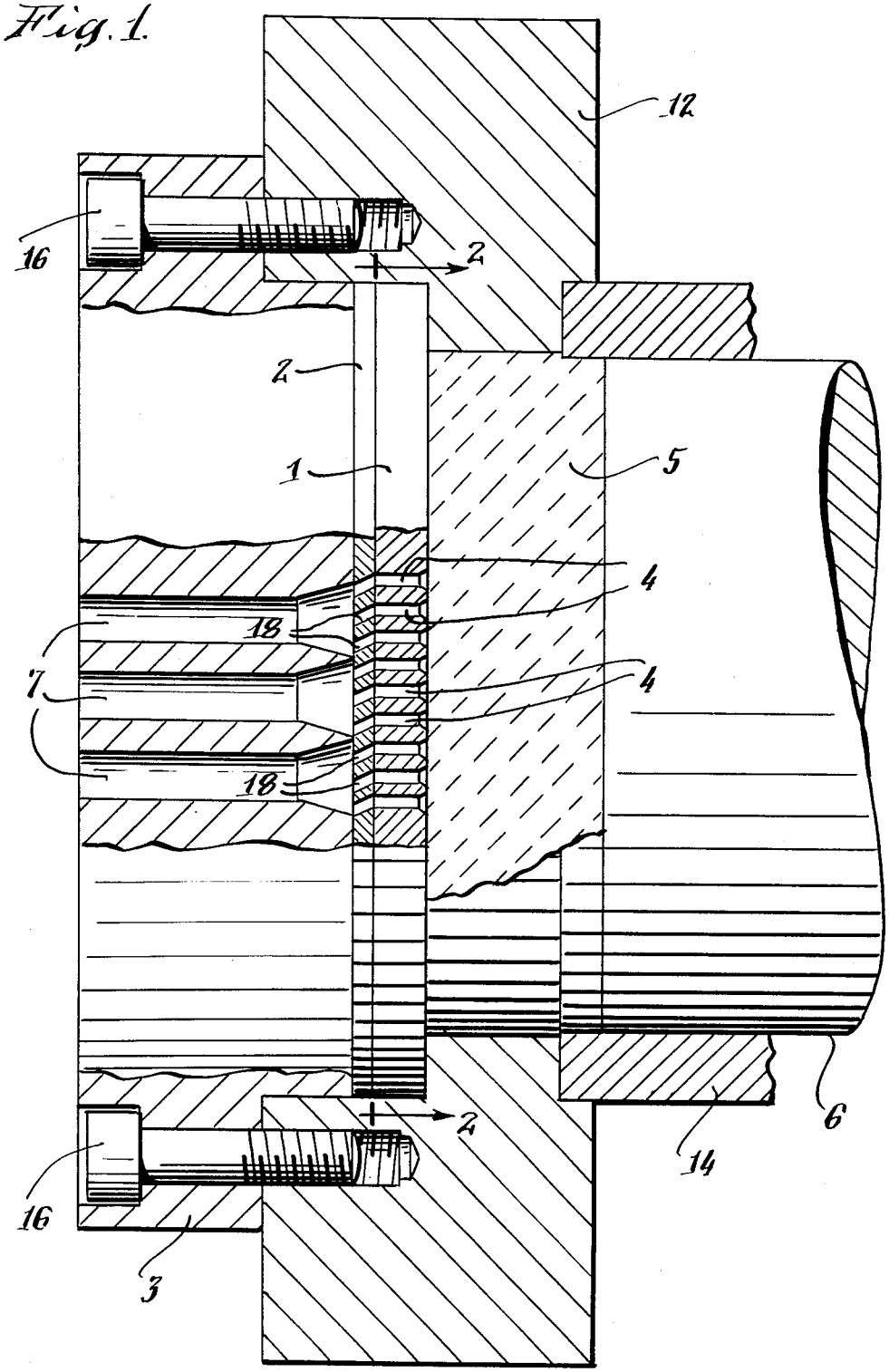
FIG. 1 is a fragmentary, side elevation view in section of a die made in accordance with an embodiment of this invention.
Figure 2:
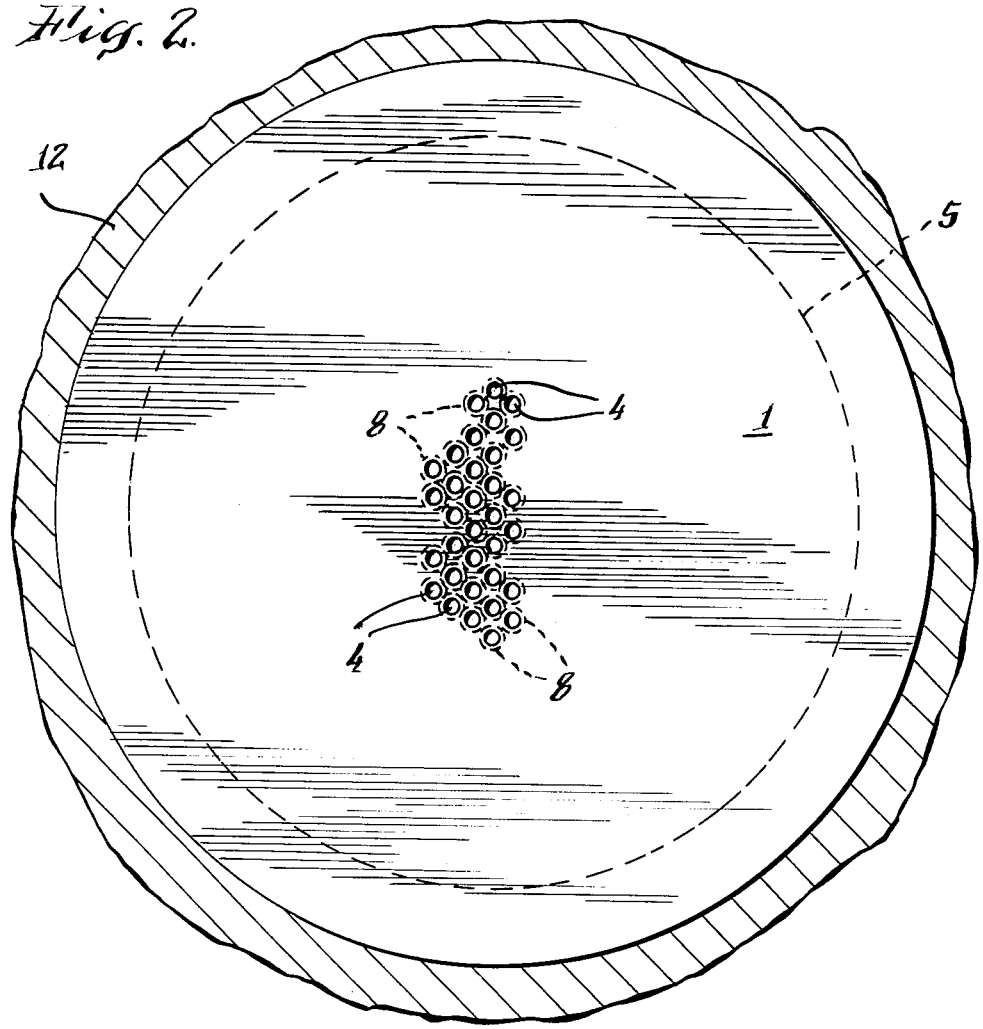
FIG. 2 is a view taken along lines 2—2 of FIG. 1.

Referring now to the drawings, a die assembly is shown having an extrusion die 1 and a breaker plate 2. The extrusion die and breaker plate are mounted by backing plate 3 to a die assembly support 12. Screws 16 secure the die, breaker plate and support plate to the support body 12. In operation, solid carbon dioxde cake 5, produced as mentioned previously, is positioned in a cylinder 14 and is compressed by a piston 6 and is thus extruded through holes 4 in the extrusion die 1. As the small cylinders of "dry ice" are forced through the holes, 4, they come in contact with the side of angular holes 18 in the breaker plate 2 and, being very brittle, are broken to the desired length, leaving rough sharp ends which provide better cutting edges when impinged against a surface to be cleaned. The pellets thus produced are propelled through large holes 7 in the backing plate 3 and thence into a storage hopper.

Figure 3:
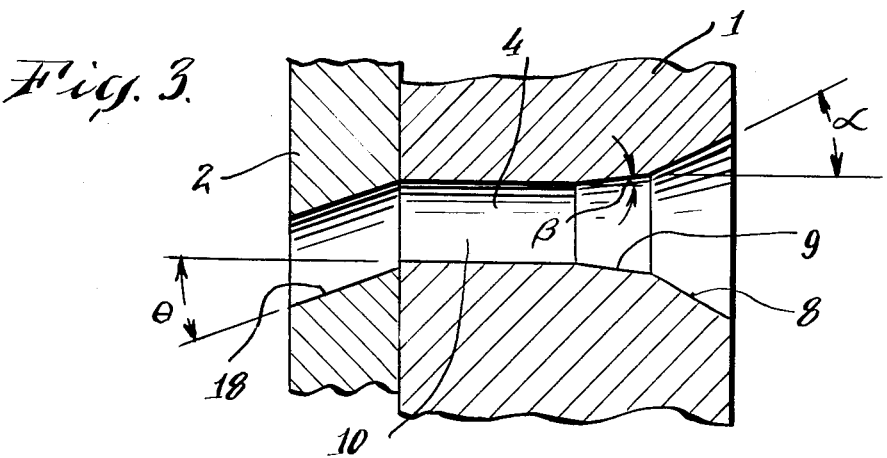
FIG. 3 is an enlarged, fragmentary view in section of extrusion and fragmenting holes of the die of FIG. 1.

The size and character of pellets produced depends on the relationship of the size of hole 4 in the extrusion die 1 (FIG. 3), the angle which the hole 18 form relative to the holes 4, the primary taper 8 and the secondary taper 9, the length of the cylindrical section 10 of the holes 4 and the velocity of the piston 6.

The commercial advantages of this invention lie in both the method of producing the pellets and in the methods of fabrication of the extrusion die. If the pellets are made by crushing or grinding large blocks of "dry ice", a large percentage of the material goes to very fine particles which are not useful in the blast cleaning process for which these pellets are intended. The result is an uneconomical loss of material. The other advantage comes from the design of the die assembly. Very high pressures are required by the extrusion process. Because of the multiplicity of holes in the extrusion die, it is greatly weakened. The necessary strength can be obtained by making the die plate very thick. However, the requirement to drill a large number of small and relatively deep holes which are accurately located, results in high fabrication costs. This invention overcomes these costs by incorporating a backing plate to provide the necessary strength and is economically fabricated because of the large easily drilled holes.

While a particular embodiment of the invention has been described, it will be apparent to those skilled in the art that variations may be made thereto without departing from the spirit of the invention and the scope of the appended claims.

What is claimed is:

1. In a cryogenic cleaning apparatus wherein pellets of material which sublime from the solid to the vapor state are projected at a body to be cleaned for abrasively cleaning the body, an improved arrangement for producing the pellets comprising:
(a) a cylinder for receiving a sublimeable material from which the pellets are to be formed;
(b) an extrusion die positioned at one end of said cylinder;
(c) said die having a plurality of pellet extrusion apertures formed therein;
(d) a piston positioned in said cylinder for forcing the sublimeable material under pressure against said extrusion die and causing said material to be extruded through said apertures in said die;
(e) a backing plate for mounting and re-enforcing said extrusion die in position at one end of said cyliner;
(f) said backing plate have a plurality of apertures formed thereupon;
(g) said backing plate apertures having a relatively greater cross sectional area than said apertures formed in said die;
(h) each of said backing plate apertures positioned for receiving pellets formed by a pluralityof said die apertures and passing said pellets through said backing plate apertures;
(i) a breaker plate positioned between said die and said backing plates;
(j) said breaker plate having a plurality of apertures formed therein; and,
(k) said breaker plate apertures communicating with said die and backing plate apertures and oriented relative to said die apertures for breaking pellets which are extruded by said die.

2. The apparatus of claim 1 wherein said apertures of said die and breaker plates have axes thereof which form an acute angle therebetween.

3. The apparatus of claim 2 wherein said breaker plate apertures are substantially equal in number with said extrusion die apertures, said die, breaker plate and backing plate apertures each have longitudinal axes thereof and said axes of said extrusion die and backing plate extend in parallel directions.

* * * * *